United States Patent
Afzal et al.

(10) Patent No.: US 9,505,648 B2
(45) Date of Patent: Nov. 29, 2016

(54) MOLD ASSEMBLIES FOR FORMING SHAPED GLASS ARTICLES

(71) Applicant: CORNING INCORPORATED, Corning, NY (US)

(72) Inventors: Bushra Afzal, Painted Post, NY (US); Keith Raymond Gaylo, Painted Post, NY (US); Elias Panides, Horseheads, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 14/713,171

(22) Filed: May 15, 2015

(65) Prior Publication Data
US 2015/0329402 A1 Nov. 19, 2015

Related U.S. Application Data

(60) Provisional application No. 62/000,181, filed on May 19, 2014.

(51) Int. Cl.
*C03B 23/023* (2006.01)

(52) U.S. Cl.
CPC ............ *C03B 23/0235* (2013.01); *Y02P 40/57* (2015.11)

(58) Field of Classification Search
CPC ................................................ C03B 23/0235
See application file for complete search history.

(56) References Cited

U.S. PATENT DOCUMENTS

| 5,441,551 A | 8/1995 | Ollfisch et al. |
| 2012/0114901 A1 | 5/2012 | Uraji et al. |
| 2012/0186772 A1* | 7/2012 | Shaber .................. B22D 11/07 164/443 |
| 2012/0297828 A1 | 11/2012 | Bailey et al. |
| 2013/0081428 A1* | 4/2013 | Liu ......................... C03B 40/00 65/106 |
| 2013/0125588 A1 | 5/2013 | Kladias et al. |

FOREIGN PATENT DOCUMENTS

| GB | 2213143 A | 8/1989 |
| JP | S557507 A | 1/1980 |
| JP | 2010285318 A * | 12/2010 |
| KR | 20140010504 A | 1/2014 |
| WO | 2012118612 | 9/2012 |

OTHER PUBLICATIONS

JP2010-285318A Machine Translation Performed JPO website Apr. 23, 2016.*
Patent Cooperation Treaty International Notification of Transmittal of the International Search Report and the Written Opinion of the International Searching Authority, international application No. PCT/US2015/031458: mailing date Aug. 14, 2015, 15 pages.

* cited by examiner

Primary Examiner — Lisa Herring
(74) Attorney, Agent, or Firm — John T. Haran

(57) ABSTRACT

Mold assemblies for forming shaped glass articles are disclosed herein. According to one embodiment, a mold assembly may include a mold body including a mold cavity, a support base, and a plenum body extending between the mold body and the support base. When the mold assembly is heated to an average temperature of greater than or equal to about 650° C. by an overhead heating source, the temperature at the center of the mold cavity may be less than at the perimeter of the mold cavity. The difference between the temperature at the center of the mold cavity and the temperature at the perimeter of the mold cavity may be at least about 12° C.

18 Claims, 8 Drawing Sheets

MOLD ASSEMBLIES FOR FORMING SHAPED GLASS ARTICLES

CROSS-REFERENCE TO RELATED APPLICATIONS

This application claims the benefit of priority under 35 U.S.C. §119 of U.S. Provisional Application Serial No. 62/000181 filed on May 19, 2014 the content of which is relied upon and incorporated herein by reference in its entirety.

TECHNICAL FIELD

The present specification relates generally to the manufacture of glass articles and, more specifically, to the manufacture of three-dimensional (3D) glass articles by thermal reforming of two-dimensional (2D) glass sheets.

BACKGROUND

There is a large demand for 3D glass covers for portable electronic devices such as laptops, tablets, and smart phones. A particularly desirable 3D glass cover has a combination of a 2D surface, for interaction with a display of an electronic device, and a 3D surface, for wrapping around the edge of the display. The 3D surface may be an undevelopable surface, i.e., a surface that cannot be unfolded or unrolled onto a plane without distortion, and may include any combination of bends, corners, and curves. The bends may be tight and steep. The curves may be irregular. Such 3D glass covers are complex and difficult to make with precision using machining processes such as grinding and milling.

Accordingly, a need exists for alternative methods and apparatuses for forming three-dimensional shaped glass articles.

SUMMARY

The embodiments described herein relate to mold assemblies for forming shaped glass articles. According to one embodiment, the mold assembly may comprise a mold body, a support base, and a plenum body. The mold body may comprise a base portion defining an underside of the mold body and a forming portion protruding from a top of the base portion. The forming portion may comprise a mold cavity having a three-dimensional profile corresponding to a shape of the shaped glass article. The support base may be positioned below the mold body. The plenum body may extend between the mold body and the support base and may comprise a plenum wall encircling a plenum space bounded by the plenum body, the mold body, and the support base. When the mold assembly is heated to an average temperature of greater than or equal to about 650° C. by an overhead heating source, a temperature at a center of the mold cavity may be less than at a perimeter of the mold cavity. The difference between the temperature at the center of the mold cavity and the temperature at the perimeter of the mold cavity may be at least about 12° C.

In another embodiment, the mold assembly may comprise a mold body, a support base, and a plenum body. The mold body may comprise a base portion defining an underside of the mold body and a forming portion protruding from a top of the base portion. The forming portion may comprise a mold cavity having a three-dimensional profile corresponding to a shape of the shaped glass article. The support base may be positioned below the mold body. The plenum body may extend between the mold body and the support base and may comprise a plenum wall encircling a plenum space bounded by the plenum body, the mold body, and the support base. At least a portion of the mold body may comprise a thermal coating having an emissivity of at least about 0.9 at about 700° C.

In yet another embodiment, the mold assembly may comprise a mold body, a support base, and a plenum body. The mold body may comprise a base portion defining an underside of the mold body and a forming portion protruding from a top of the base portion. The forming portion may comprise a mold cavity having a three-dimensional profile corresponding to a shape of the shaped glass article. The support base may be positioned below the mold body. The plenum body may extend between the mold body and the support base and may comprise a plenum wall encircling a plenum space bounded by the plenum body, the mold body, and the support base. An outer perimeter of the plenum wall may comprise a channel wherein a thickness of the plenum wall in the channel is less than a thickness of the plenum wall outside the channel. The channel may restrict thermal conduction from the edge of the mold cavity, through the plenum body, to the support base. The underside of the mold body may comprise an annular channel adjacent to a projected perimeter of the mold cavity. The annular channel may restrict thermal conduction from the mold body adjacent to the edge of the mold cavity to the central region of the mold cavity. The forming portion of the mold body may comprise notches adjacent to corners of the mold cavity. The notches may promote increased temperature in the corners of the mold cavity. The forming portion of the mold body may comprise diagonal facets adjacent to the corners of the mold cavity. The diagonal facets may promote increased temperature in the corners of the mold cavity.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
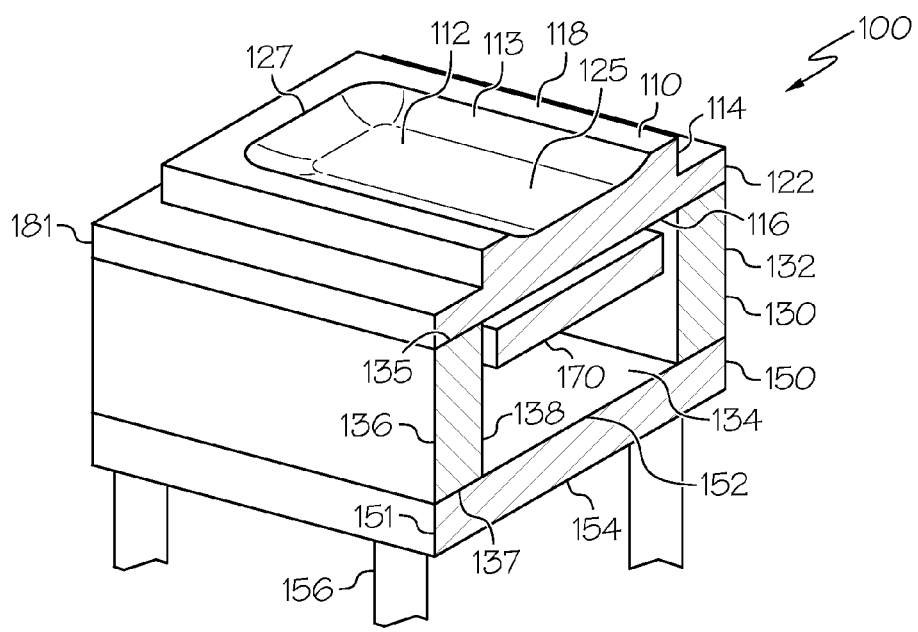
FIG. 1A schematically depicts a 3D cross-sectional view of a mold assembly, according to one or more embodiments shown and described herein.

Reference will now be made in detail to embodiments of mold assemblies, examples of which are illustrated in the accompanying drawings. Whenever possible, the same reference numerals will be used throughout the drawings to refer to the same or like parts. One embodiment of a mold assembly is schematically depicted in FIG. 1. The mold assembly generally includes a mold body, a support base, and a plenum body. The mold body includes a mold cavity wherein when the mold assembly is heated to temperatures sufficient to shape glass articles, the temperature at the center of the mold cavity is less than at the perimeter of the mold cavity. Various embodiments of mold assemblies for forming 3D glass articles will be described herein with specific reference to the appended drawings.

Generally, mold assemblies may be used for shaping glass articles. For example 2D glass articles, such as glass sheets, may be shaped into 3D glass articles by contacting the glass with a mold cavity of the mold assembly. Shaping glass articles may require relatively high temperatures, such as greater than about 600° C., that may cause cosmetic defects to a surface of the glass article. Additionally, mold assemblies exposed to higher temperatures may deform more quickly due to repeated exposure to relatively high temperatures. As such, relatively low forming temperatures may be desirable to avoid cosmetic defects in the shaped glass article and to prevent degradation of the mold assembly. However, the forming temperatures must be high enough to sufficiently impart the 3D shape to the glass article in the molding cavity.

In particular, when shaping a glass article, it may be advantageous to heat some areas of the mold cavity to higher temperatures than other areas of the mold cavity. For example, higher temperatures may be present in areas where significant deformation of the 2D glass article occurs to achieve the desired 3D shape, such as at the perimeter of a mold cavity designed to form a glass cover for a mobile device. Lower temperatures may be present in areas of the mold cavity that do not undergo as much geometric forming, such as near the center of the mold cavity. This results in glass molded near the center of the mold cavity having fewer cosmetic defects by avoiding exposure to higher forming temperatures in those areas. As such, overall glass quality may be improved when higher temperatures are present only in regions of the mold cavity that impart significant deformation to the 2D glass article to achieve the desired 3D, and reduced temperatures are present in regions of the mold cavity that do not significantly deform the 2D glass article.

As disclosed herein, molds may be designed that, when exposed to a high temperature environment, achieve higher temperatures at certain regions of the mold cavity compared to other regions of the mold cavity. In one embodiment, 2D glass sheets may be shaped into 3D glass articles that may be utilized as glass covers for portable electronic devices. In such glass articles, significant 3D forming may occur at or near the perimeter of the mold cavity, such as at the edges and corners of the mold cavity. As such, the mold cavity may have higher temperatures at or near the perimeter of the mold cavity, and especially at or near corners of the mold cavity while the center of the mold cavity may be relatively cool compared to the perimeter of the mold cavity. With such a configuration, cosmetic defects for 3D glass articles, such as glass covers for portable electronic devices, may be reduced near the center by low temperature exposure near the center of the mold cavity while high temperature regions at the perimeter of the mold cavity are sufficiently heated to impart the desired 3D shape to the edges and corners of the glass article. As described herein, mold assemblies may be fabricated that exhibit increased temperature differentials between the center and perimeter of the mold cavity thereby reducing defects in the finished 3D shaped glass article and improving the overall quality of the glass article.

In particular, the geometric configuration of the mold assembly may affect the temperature profile of the mold assembly by locally increasing or decreasing the thermal conductance in specific regions of the mold assembly. Additionally, coatings applied to specific regions of the mold assembly may enhance thermal radiation emission and absorption in these regions of the mold assembly thereby assisting in temperature control. These modifications to the thermal transport properties of the mold assembly may be systematically utilized to change the temperature profile of the mold assembly and thereby reduce the number of defects in the resultant glass article.

Figure 1B:
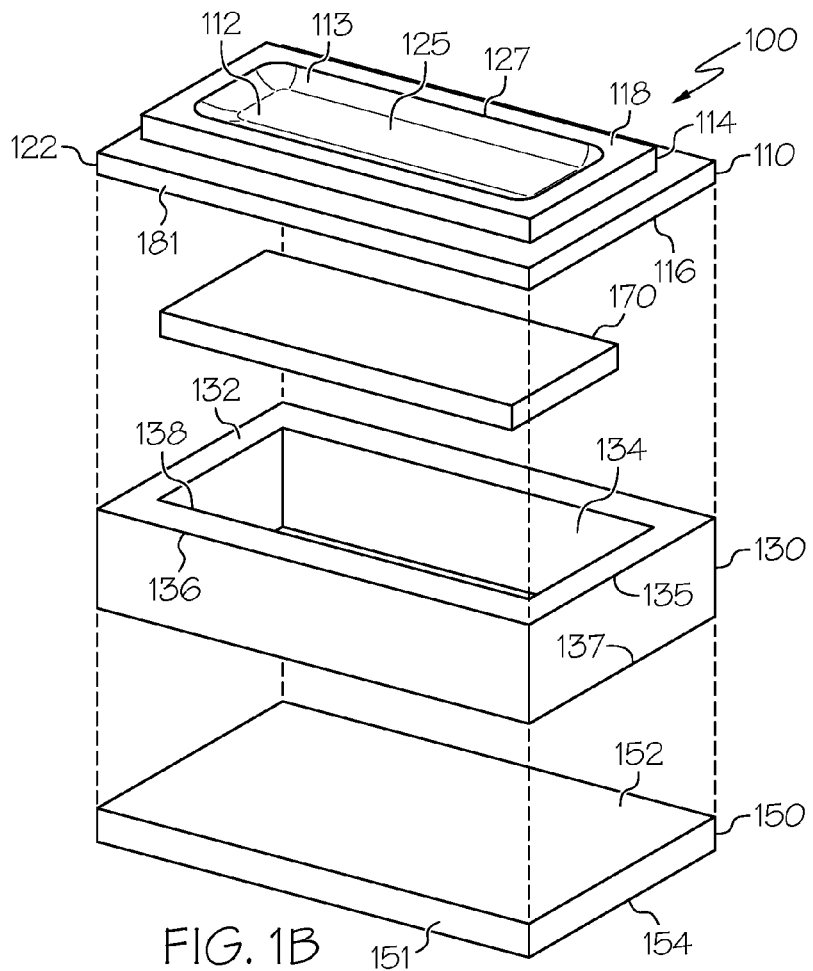
FIG. 1B schematically depicts a 3D exploded view of a mold assembly, according to one or more embodiments shown and described herein.

Referring now to FIGS. 1A and 1B, a mold assembly 100 according to one or more embodiments described herein is schematically depicted. The mold assembly may generally include a mold body 110 comprising a mold cavity 112, a plenum body 130, a support base 150, and a cooling apparatus 170. FIGS. 1A and 1B depict a "base case" mold assembly 100 for shaping glass. As will be described herein, modifications, such as coatings on portions of the base case mold assembly 100 and/or geometric characteristics of the base case mold assembly 100, may be incorporated into the mold assembly 100 to increase the temperature differential between the center 125 of the mold cavity 112 and the perimeter 127 of the mold cavity 112 and thereby improve the quality of the resultant glass article.

In the embodiments described herein, the mold body 110 generally comprises a base portion 122 and a forming portion 114. The base portion 122 defines the underside 116 of the mold body 110. The forming portion 114 protrudes from the top of the base portion 122 and forms a topside 118 of the mold body 110. A mold cavity 112 is formed in the topside 118 of the mold body 110 and includes a forming surface 113.

In the embodiments described herein, the mold cavity 112 may be formed as an impression in the topside 118 of the mold body 110 and generally has a three-dimensional profile that corresponds to a shape of the resultant shaped glass article (not shown). The mold cavity 112 includes a perimeter 127 defining the boundary between the topside 118 of the mold body 110 and the forming surface 113 of the mold cavity 112. The mold body 110 may further include ports (not shown) through which vacuum can be applied to the mold cavity 112 to draw the glass being shaped against the forming surface 113 of the mold cavity 112, thereby assisting the molding process. The ports may open to the mold cavity 112 through the forming surface 113 and are in fluid communication with a vacuum device (not shown), such as a vacuum pump or the like, applying vacuum to the mold cavity 112 of the mold body 110.

In the embodiments described herein, the mold assembly 100 also includes a plenum body 130 positioned below the mold body 110. The plenum body 130 includes a plenum wall 132. The plenum wall 132 encircles a plenum space 134 such that the plenum space 134 is at least partially bounded by the plenum wall 132. The plenum wall 132 has a wall thickness measured from an outside edge 136 of the plenum wall 132 to the inside edge 138 of the plenum wall 132 adjacent the plenum space 134. The plenum wall 132 also has a wall height measured from the topside 135 of the plenum wall 132 to the underside 137 of the plenum wall 132.

The mold assembly 100 further includes a support base 150. The support base 150 has a topside 152 and an underside 154. The support base 150 is generally positioned below the plenum body 130 and mold body 110. In embodiments, the support base 150 may be mounted on support standoffs 156. The support base 150 may act as a support for the other portions of the mold assembly 100. For example, the topside 152 of the support base 150 may be substantially flat so as to align with the underside 137 of the plenum wall 132.

As shown in FIGS. 1A and 1B, the plenum body 130 is positioned between the mold body 110 and the support base 150 such that the plenum body is in direct contact with the support base 150 and the mold body 110. For example, the underside 116 of the mold body 110 may be in direct contact with the topside 135 of the plenum wall 132 and the underside 137 of the plenum wall 132 may be in direct contact with the topside 152 of the support base 150. In such a configuration, the plenum space 134 is bounded by the plenum body 130, the mold body 110, and the support base 150. In one embodiment, the plenum body 130 is in direct contact with the base portion 122 of the mold body 110 at or near the outer edge 181 of the base portion 122 of the mold body 110, and the plenum space 134 is below the mold cavity 112. The underside 137 of the plenum body 130 may be in contact with the outer edge 151 of the support base 150.

In the embodiment depicted in FIGS. 1A and 1B, the mold body 110, the plenum body 130, and the support base 150 are three discrete parts which are secured to one another. For example, the mold body 110, the plenum body 130, and the support base 150 may be bolted together or one or more of the mold body 110, the plenum body 130, and the support base 150 may have features such as pins on its top surface that engage features such as holes in the bottom surface of another of the portions of the mold assembly 100. However, in another embodiment (not shown), the mold body 110, the plenum body 130, and the support base 150, or any two of the mold body components, may be formed as a unitary body.

The mold body 110, the plenum body 130, and the support base 150 may be formed from materials suitable for withstanding the elevated temperatures and thermal cycling associated with glass forming processes without degrading, such as refractory metals, refractory ceramics, or the like. For example, the mold body 110 may be formed from any metal or other material capable of withstanding high temperatures, such as refractory metals, refractory ceramics, or the like. In embodiments, the mold body 110 may be formed from a high temperature alloy with high hardness, such as, but not limited to, nickel-based alloys such as Inconel® 718 or other, similar high temperature alloys. Some mold bodies 110 may comprise base metals, such as, for example, Ni or Cr. The plenum body 130 and support base 150 may comprise a metal such as, for example, 316 stainless steel. However, it is contemplated that wide variety of materials may be used as the mold body 110, the plenum body 130, and/or the support base 150.

The glass, which is shaped by contact with the forming surface 113, may generally be any glass suitable for 3D forming. It is also contemplated herein that ceramic materials and/or glass-ceramic materials may be shaped with the mold assemblies described herein. In some embodiments, the glass may be ion-exchangeable aluminosilicate glass. Examples of such ion-exchangeable aluminosilicate glass include, but are not limited to, Gorilla Glass® and Gorilla Glass II® (commercially available from Corning, Inc.). Such glass, especially after 3D molding, may be well suited for many uses, such as, for example, as cover glass for hand-held consumer electronic devices.

In order to achieve the desired 3D shaping of a glass article, the mold assembly 100 may be placed in a high temperature environment and a glass article may be contacted with the forming surface 113 to shape the glass article. For example, the mold assembly 100 may be contained within a thermal enclosure, such as an oven, which is capable of producing a controlled environment at elevated temperatures. The glass may be exposed to temperatures greater than about 400° C., such as between about 600° C. and about 1100° C., during the glass shaping process.

In one embodiment, one or more heaters 180 (shown in FIG. 1C) may be disposed above the mold assembly 100, in an overhead position. The heater 180 may be a radiant heater, which heats the mold assembly 100 and, in particular, the mold cavity 112, by radiant energy. Examples of suitable heaters may include microwave heaters, radio wave heaters, visible light heaters, infrared light heaters, and/or electric heaters. For example, in one embodiment, the heater 180 is an infrared radiant heater. Alternatively, the heater 180 may be an electric heater such as a resistive heater. In other embodiments, the heater 180 may comprise a radiation emitter body which may emit or absorb thermal radiation.

The mold assembly 100 may further comprise a cooling apparatus 170. In one embodiment, the cooling apparatus 170 may be positioned below the mold body 110 in the plenum space 134. For example, the cooling apparatus 170 may be positioned in the plenum space 134 near the underside 116 of the mold body 110 proximate the central portion of the forming surface 113. The cooling apparatus 170 may include a heat exchanger and, in some embodiments, may be shaped as a plate. The cooling apparatus 170 may be in close proximity but not in physical contact with the mold body 110. This allows heat transfer from the mold body 110 to the cooling apparatus 170 to occur primarily by radiation. More specifically, for radiative heat transfer to occur, there should be a path of radiation between the cooling apparatus 170 and the mold body 110. Separating the cooling apparatus 170 from the mold body 110 allows the design of the mold body 110 to be independent of the design of the cooling apparatus 170, or vice versa. This may reduce the manufacturing cost of the mold assembly 100.

Generally, when the heater 180 is positioned above the mold body 110 and the cooling apparatus 170 is positioned below the mold body 110, radiative heat flows from the heater 180 into the mold body 110 by radiative absorption and radiative heat flows from the underside 116 of the mold body 110 to the cooling apparatus 170. In addition, heat from the mold body 110 is conducted through the mold body 110 and through the plenum body 130 to the support base 150. As such, while heating the glass pre-form to a suitable state for forming, the temperature of the radiant heater may be greater than the temperature of the mold assembly 100, which may be greater than the temperature in the plenum space 134 near the cooling apparatus 170 due to the transfer of heat through the mold assembly 100. The loss of heat from the mold assembly 100 and, in particular, the mold body 110 near the perimeter 127 of the mold cavity 112, may degrade the ability of the mold to effectively shape the glass without defects. In particular, when those areas of the mold cavity 112 responsible for the largest deformations in the 3D forming process are too cool, the ability of the mold to effectively mold the glass may be compromised. Accordingly, in the embodiments described herein, the mold assemblies may incorporate one or more features, such as geometric features, thermal coatings, or the like, to modify the conduction and radiation of heat from and through the molds such that the temperature differential between the central portion 125 of the mold cavity 112 and the perimeter 127 of the mold cavity 112 is maintained and increased.

Figure 2A:
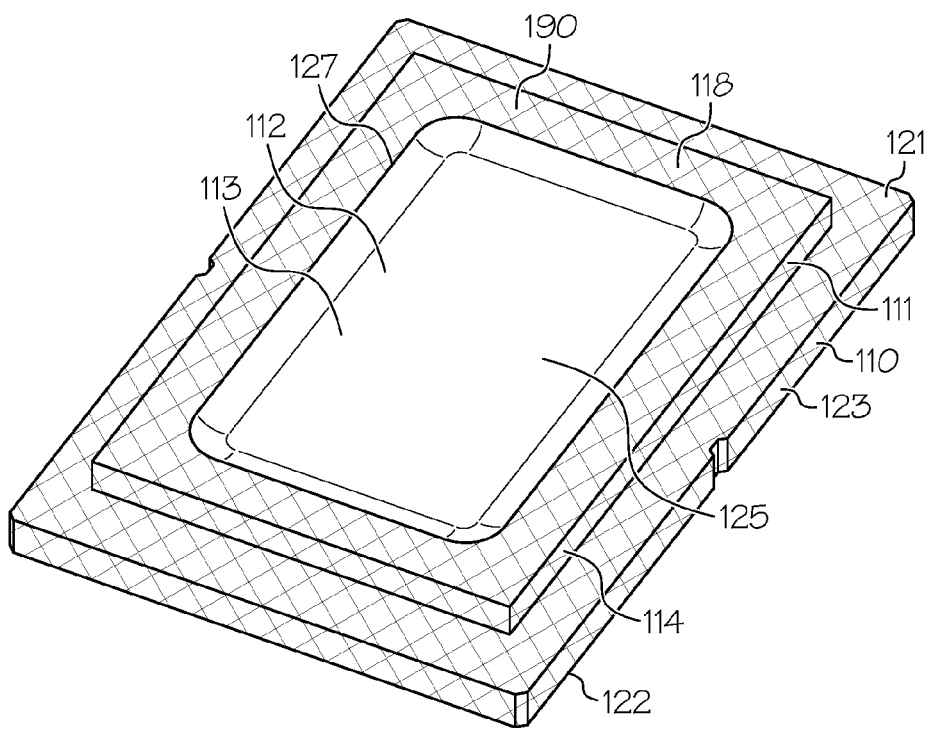
FIG. 2A schematically depicts a 3D view of a mold body with a coating, according to one or more embodiments shown and described herein.
Figure 2B:
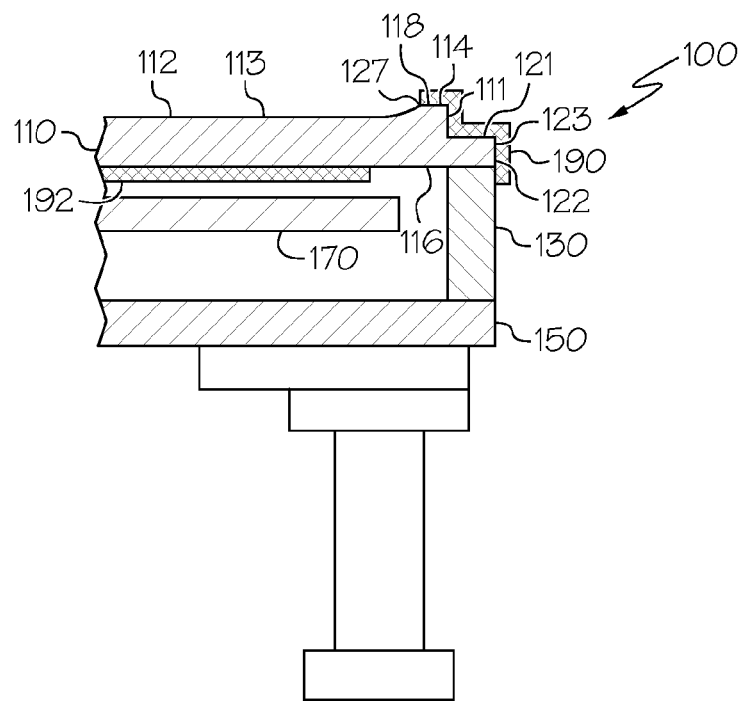
FIG. 2B schematically depicts a 2D cross-sectional side view of a mold assembly comprising a coating, according to one or more embodiments shown and described herein.

Referring now to FIG. 2A and 2B, in one embodiment, at least a portion of the mold body 110 may comprise one or more thermal coatings 190, 192 that enhance the radiative thermal transport into the coated area of the mold body from the heater 180 and into the cooling apparatus 170. The thermal coatings 190, 192 may be "high-emissivity" coatings that have a higher emissivity than an uncoated surface of the mold body 110. Emissivity, as used herein, refers to the ratio of the energy radiated from a material's surface to that radiated from a theoretical blackbody at the same temperature and wavelength and under the same viewing conditions. Accordingly, emissivity may also be a function of temperature. The emissivity values disclosed herein refer to the emissivity of the coated mold body at about 700° C., unless otherwise specified. Emissivity is a dimensionless unit that can theoretically range from 0 to 1 in materials, where an emissivity of 1 represents a theoretical blackbody. Emissivity also depends on the surface finish of a material. As such, as used herein, an increased emissivity corresponds to an increase of emissivity relative to an uncoated or untreated surface, such as an uncoated or untreated surface of the mold body 110, relative to the emissivity of a treated or coated surface of the mold body 110. Also, as used herein, high emissivity refers to increased emitted thermal radiation and increased thermal absorption of radiated energy. While theoretical emissivity corresponds to a comparison with black body emission, as described herein, high emissivity thermal coatings 190, 192 enhance thermal emission and thermal absorption of thermal radiation incident on the thermal coatings.

In one embodiment, high emissivity on a portion of the mold assembly 100 can be achieved by coating a surface of the mold assembly 100 with a high emissivity thermal coating 190, 192. Such high-emissivity thermal coatings may increase the emissivity of a surface, such as a surface of the mold body 110, thereby increasing the temperature of the mold assembly 100 in the coated area. Examples of high emissivity thermal coatings 190, 192 include, without limitation, Aremco CP3015-BL (commercially available from Aremco Products, Inc. of Valley Cottage, N.Y.). In one embodiment, the thermal coating 190, 192 may comprise a high emissivity paint. For example, the high emissivity paint may increase the emissivity of coated portions of the mold body 110 to greater than or equal to about 0.9 at about 700° C., greater than or equal to about 0.95 at about 700° C., or even greater than or equal to about 0.97 at about 700° C. An uncoated mold body 110 may have an emissivity of 0.7 to about 0.85 at about 700° C.

In one embodiment, a thermal coating 192 may be positioned adjacent to the perimeter 127 of the mold cavity 112. FIGS. 2A and 2B generally show the portion(s) of the mold body 110 which may be coated with cross hatching. In one embodiment, the thermal coating 190 may be applied to the topside 118 of forming portion 114 of the mold body 110. In another embodiment, one or more of the sides 111 of the forming portion 114 the mold body 110 may comprise the thermal coating 190. In another embodiment, the top 121 of the base portion 122 of the mold body 110 may comprise the thermal coating 190. In another embodiment, one or more of the sides 123 of the base portion 122 of the mold body 110 may comprise the thermal coating 190. In another embodiment, at least a portion of the outside edge 136 of the plenum wall 132 may comprise the thermal coating 190. The thermal coating 190 may enhance radiative heat transport into the mold body 110 near the perimeter 127 of the mold cavity 112 from the surrounding environment. The enhanced radiative absorption increases the temperature of the forming portion 114 of the mold body 110 near the perimeter 127 of the mold cavity 112 relative to the temperature at the center 125 of the mold cavity 112. The increased temperature at the perimeter 127 of the mold cavity 112 caused by the thermal coating 190 allows for adequate 3D forming while the cooler temperatures at the center 125 of the mold cavity 112 prevent cosmetic defects to the glass article in that region.

In another embodiment, at least a portion of the underside 116 of the mold body 110 beneath the mold cavity 112 may comprise a thermal coating 192 which enhances the emissivity of the coated area. The thermal coating 192 may enhance radiative heat transport from the underside 116 of the mold body 110 to the cooling apparatus 170 positioned in the plenum space 134 adjacent to the underside 116 of the mold body 110. Due to the arrangement of the heater 180 and the cooling apparatus 170, the plenum space 134 is cooler than the mold body 110, and thus the underside 116 of the mold body 110 radiates heat into the plenum space 134. The thermal coating 192 may enhance the emission of thermal radiation from the underside 116 of the mold body 110 beneath the mold cavity 112, thus aiding in keeping the center 125 of the mold cavity 112 cool. The decreased temperature at the center 125 of the mold cavity 112 caused by the thermal coating 192 prevents cosmetic defects to the glass article on top of the coated region, while increased temperature at the perimeter 127 of the mold cavity 112 allows for adequate 3D forming.

Figure 3:
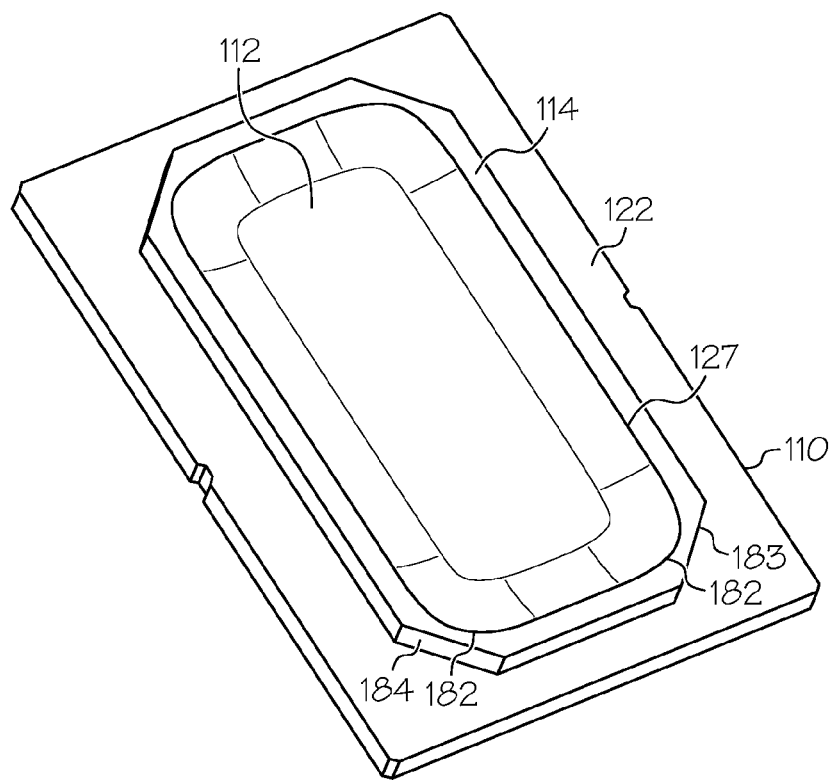
FIG. 3 schematically depicts a 3D view of the topside of a mold body comprising a topside diagonal cut in the mold body, according to one or more embodiments shown and described herein.
Figure 4:
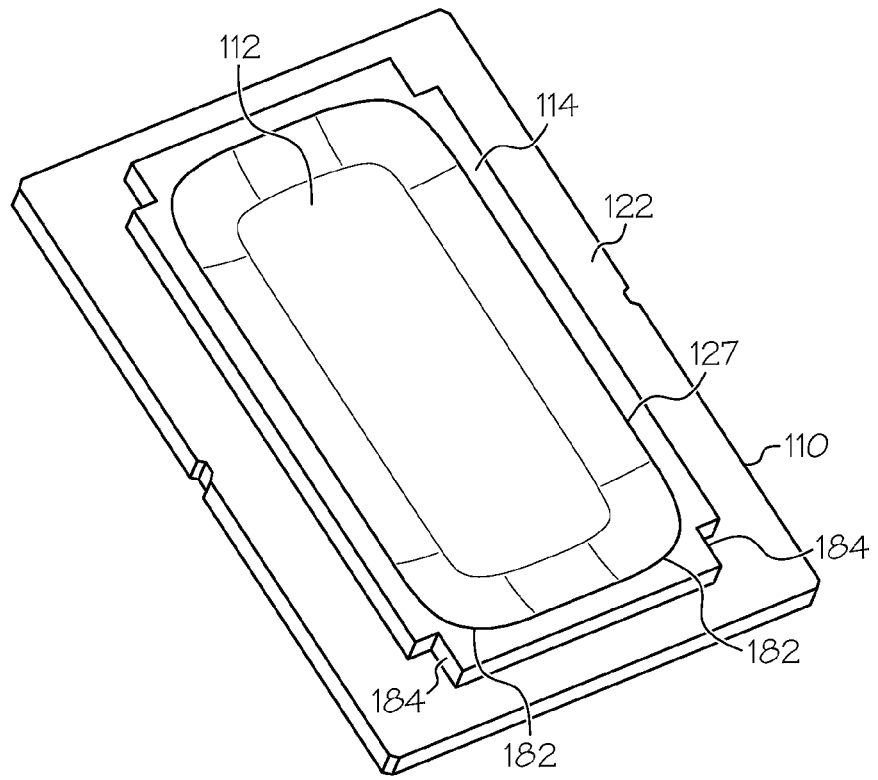
FIG. 4 schematically depicts a 3D view of the topside of a mold body comprising a topside notch cut in the mold body, according to one or more embodiments shown and described herein.

Referring now to FIGS. 3 and 4, in one embodiment, the forming portion 114 of the mold cavity 112 may have a geometrical configuration that promotes higher temperatures at the corners 182 of the mold cavity 112. As shown in FIG. 3, in one embodiment, the forming portion 114 of the mold body 110 may comprise a diagonal facet 183 adjacent to the corners 182 of the mold cavity 112. The diagonal facets 183 promote increased temperature near the corners 182 of the mold cavity 112. Without being bound by theory, it is believed that moving the exposed edge 184 of the mold body 110 proximate to the corner 182 of the mold cavity 112 may locally increase the heat gained by the mold cavity 112 in this area by reducing the mass to be heated and moving the area 184 of the mold body 110 exposed to thermal radiation closer to the mold cavity, effectively causing heat to build up more rapidly in the corners 182 of the mold cavity 112.

Referring now to FIG. 4, in another embodiment, the forming portion 114 of the mold body 110 may comprise notches 184 adjacent to the corners 182 of the mold cavity 112. The notches 184 may promote increased temperature near the corners of the mold cavity 112, similar to the diagonal facets 182. The diagonal facets 183 and the notches 184, collectively referred to herein as forming portion cut-outs, may serve to increase temperature at the corners 182 of the mold cavity 112 where complex 3D shaping occurs and higher temperatures may be necessary for effective shaping. The increased temperature at the corners 182 of the mold cavity 112 caused by the forming portion cut-outs allows for adequate 3D forming at the corners 182 of the mold cavity 112.

The corners of the forming portion 114 may be relatively hot as compared with other portions of the mold assembly 100. Without being bound by theory, it is believed that the forming portion 114 cut-outs may increase the temperature at the corners of the mold cavity 112 by bringing the hot corners of the forming portion 114 of the mold body 110 closer to the corners 182 of the mold cavity 112 where glass may be three-dimensionally shaped.

Figure 5A:
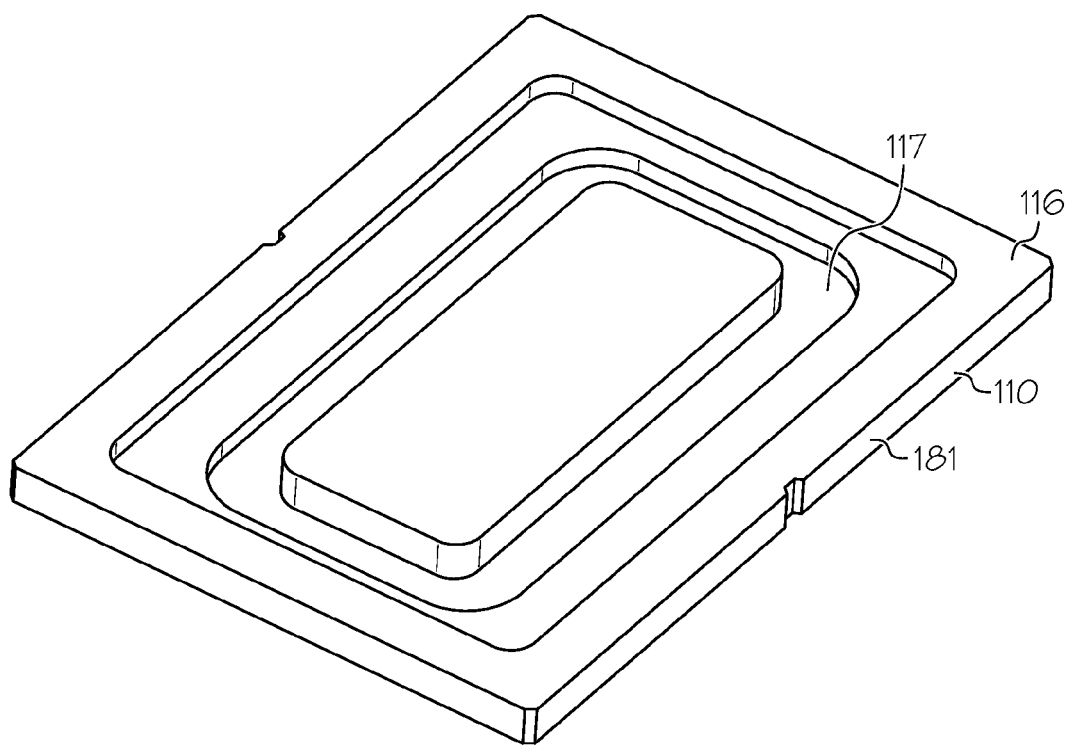
FIG. 5A schematically depicts a 3D view of the underside of a mold body comprising an underside cut in the mold body, according to one or more embodiments shown and described herein.
Figure 5B:
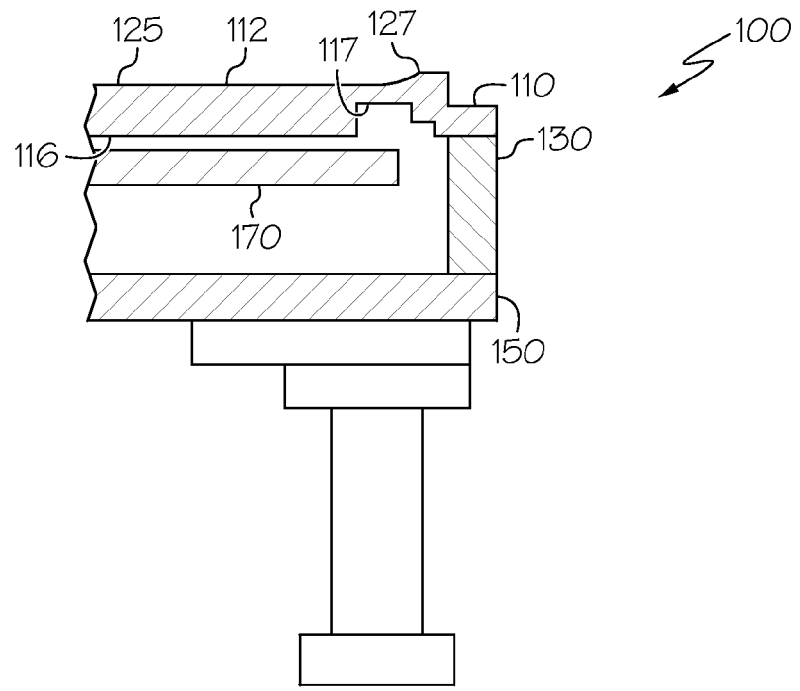
FIG. 5B schematically depicts a 2D cross-sectional side view of a mold assembly comprising an underside cut in the mold body, according to one or more embodiments shown and described herein.

Now referring to FIGS. 5A and 5B, in another embodiment, the underside 116 of the mold body 110 may comprise an annular channel 117 adjacent to and outside a projected perimeter 127 of the mold cavity 112. As used herein, the projected perimeter 127 of the mold cavity 112 is the approximate area on the underside 116 of the mold body 110 positioned below the perimeter 127 of the mold cavity 112 on the topside 118 of the mold body 110. The annular channel 117 may decrease the thickness of the mold body 110 near the perimeter 127 of the mold cavity 112. The decreased thickness may restrict thermal conduction from the area of the mold body 110 adjacent to perimeter 127 of the mold cavity 112 to the area of the mold body 110 near the center of the mold cavity 112. The restricted thermal conduction may result in elevated temperatures at or near the perimeter 127 of the mold cavity 112 and decreased temperatures near the center 125 of the mold cavity 112. The increased temperature at the perimeter 127 of the mold cavity 112 allows for adequate 3D forming while the cooler temperatures at the center 125 of the mold cavity 112 prevent cosmetic defects to the glass article in that region.

The total thickness of the mold body 110 may be greater than or equal to about 8 mm and less than or equal to about 15 mm, or greater than or equal to about 10 mm and less than or equal to about 12 mm. The depth of the annular channel may be greater than or equal to about 2 mm to less than or equal to about 8 mm or even greater than or equal to about 4 mm to less than or equal to about 6 mm.

In one embodiment, the annular channel 117 may comprise a stepped pattern, as shown in FIGS. 5A and 5B. With such a configuration, the depth of the annular channel may be greater near the projected center 125 of the mold cavity 112 than near the sides 111 of the forming portion 114 of the mold body 110. The stepped configuration may be advantageous as it extends the thinner cross-section of the mold body, thereby decreasing the conductance between the sides 111 of the forming portion 114 of mold body 110 and the plenum wall 130. This will reduce the heat conducted away from edge 127 of the mold cavity toward the plenum wall 130.

Figure 6A:
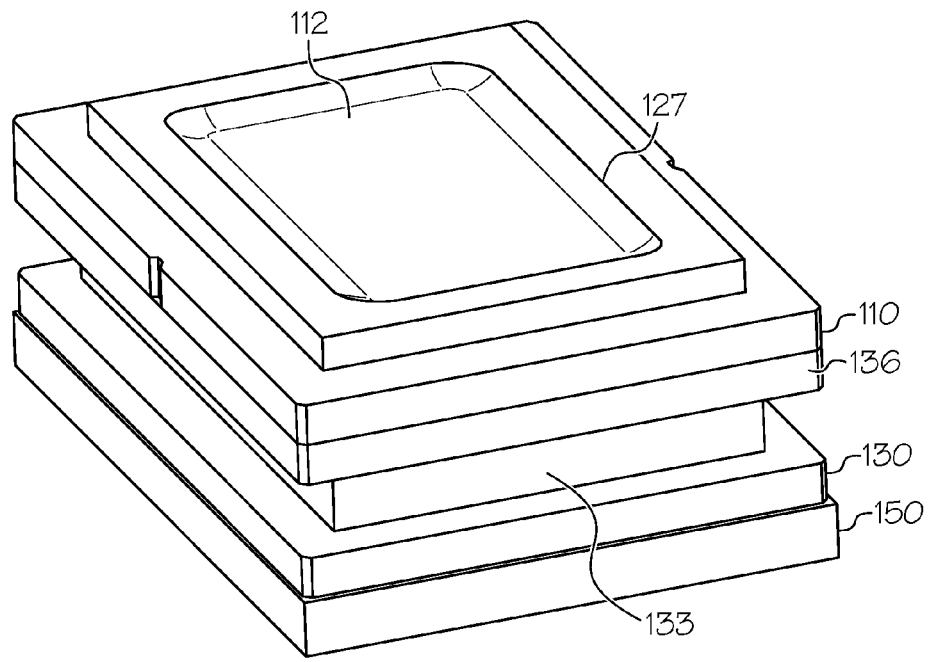
FIG. 6A schematically depicts a 3D view of a mold assembly with a plenum cut, according to one or more embodiments shown and described herein.
Figure 6B:
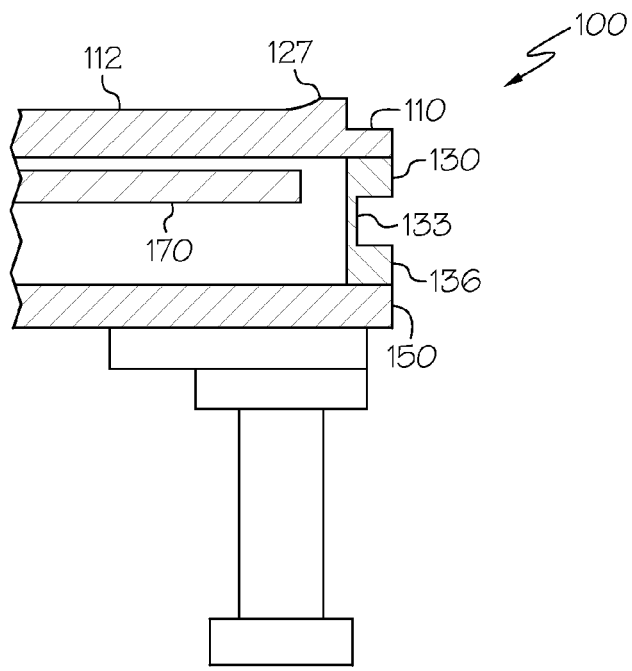
FIG. 6B schematically depicts a 2D cross-sectional side view of a mold assembly with a plenum cut, according to one or more embodiments shown and described herein.

Now referring to FIGS. 6A and 6B, in another embodiment, an outside edge 136 of the plenum wall 132, defining an outer perimeter of the plenum wall 132, may comprise a channel 133 such that a thickness of the plenum wall 132 in the channel 133 is less than the thickness of the plenum wall 132 outside the channel. The channel 133 may wrap around the entire outside edge 136 of the plenum wall 132. Alternatively, the channel 133 may run only a portion of the total length of the plenum wall 132. In one embodiment, the channel 133 is positioned near a central portion of the plenum wall 132 relative to the height of the plenum wall 132. The reduced thickness of the plenum wall 132 near the channel 133 restricts thermal conduction from the perimeter 127 of the mold cavity 112, through the plenum body 130, to the support base 150. The reduced conduction through the plenum wall 132 may result in elevated temperatures at or near the perimeter 127 of the mold cavity 112. The increased temperature at the perimeter 127 of the mold cavity 112 allows for adequate 3D forming.

The total thickness of the plenum wall 132 may be greater than or equal to about 8 mm and less than or equal to about 12 mm. In some embodiments, the thickness of the plenum wall 132 may be about 10 mm. The depth of the channel may be greater than or equal to about 6 mm and less than or equal to about 10 mm or even greater than or equal to about 7 mm and less than or equal to about 9 mm. In some embodiments, the depth of the channel may be about 8 mm.

The features of the mold assemblies described herein may be utilized individually or in various combinations to elevate the temperature of the mold body 110 at or near the perimeter 127 of the mold cavity 112. As such, a mold assembly 100 may comprise one or more of these features including the addition of high emissivity thermal coatings 190, 192 on the mold assembly 100, forming portion cut-outs, and specific geometric features of the plenum body 130 and underside 116 of the mold body 110. Each of these features may independently enhance the temperature difference from the center 125 of the mold cavity 112 to the perimeter 127 of the mold cavity 112. As used herein, the "temperature difference" or "temperature differential" is defined as the difference of the temperature of the mold body 110 at about 0.5 mm below the center 125 of the mold cavity 112 and the temperature of the mold body 110 at about 0.5 mm below the perimeter 127 of the mold cavity 112. The temperature difference may be increased by any single feature, and may be further increased by the combination of two or more of the features. Without being bound by theory, it is believed that in some embodiments, the temperature difference increase caused by each feature may be additive to a total increase in temperature difference caused by a combination of the features equal to about the sum of the features individually.

Generally, the temperature at the center of the mold cavity is less than the temperature at the perimeter of the mold cavity when the mold cavity is heated to an average temperature of greater than or equal to about 650° C., greater than or equal to about 700° C., greater than or equal to about 750° C., greater than or equal to about 800° C., or greater than or equal to about 850° C. by an overhead heating source. In some embodiments, the difference between the temperature at the center of the mold cavity and the temperature at the perimeter of the mold cavity may be at least about 12° C. In other embodiments, the difference between the temperature at the center of the mold cavity and the temperature at the perimeter of the mold cavity may be at least about 15° C., at least about 18° C., at least about 30° C., or even at least about 45° C. In comparison, for a base case mold assembly, the difference between the temperature at the center of the mold cavity and the temperature at the perimeter of the mold cavity may be less than or equal to about 9° C.

The mold assemblies described herein may be utilized in the manufacture of 3D glass articles and may be incorporated into the systems and methods described in U.S. Patent Publication No. 2012/0297828 entitled "Glass Molding Systems and Related Apparatus and Method," the teachings of which are incorporated herein by reference in their entirety.

EXAMPLES

Various embodiments will be further clarified by the following examples.

Example 1

Figure 7:
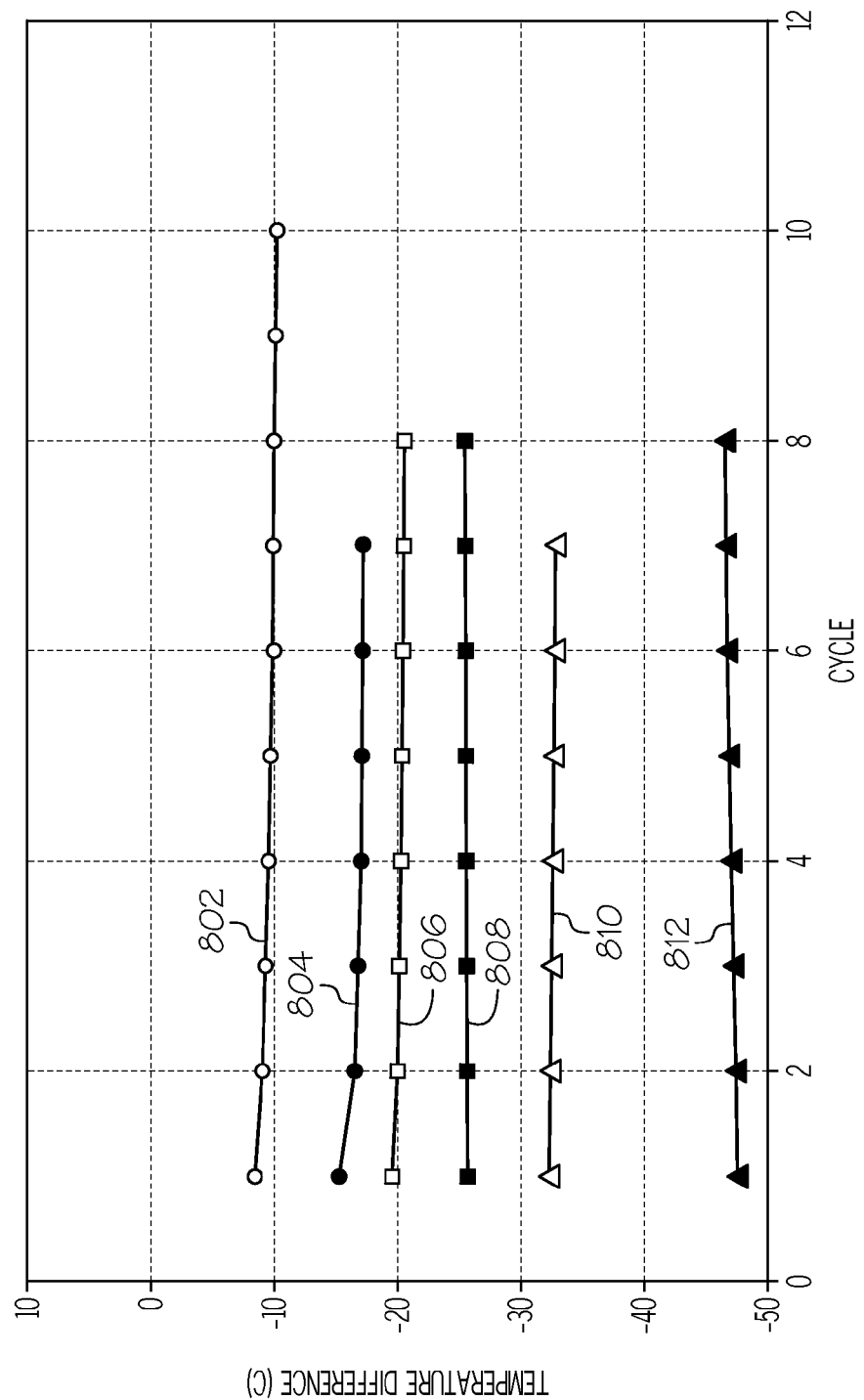
FIG. 7 graphically depicts modeled temperature differences between the center and perimeter of the mold cavity during heating for various mold assemblies with various features.

Finite element models of the mold assemblies were modeled on the commercially available computer software Ansys Fluent. The mold assembly features described above were incorporated into the base mold singularly and in combination. The temperature differences from the center of the mold cavity to the perimeter of the mold cavity were analyzed for the mold assembly features. FIG. 7 shows the results of the computational model, where the horizontal axis represents the thermal cycle evaluated and the vertical axis represents the temperature difference between the center and perimeter of the mold cavity when the mold cavity is heated to about 650° C. Each thermal cycle consisted of a heating of the mold assembly to about 650° C. by an overhead heat radiative heat source, contacting of the glass with the mold assembly, and a subsequent cooling of the mold assembly. The maximum temperature of the mold assembly corresponds to each cycle of FIG. 7.

Figure 1C:
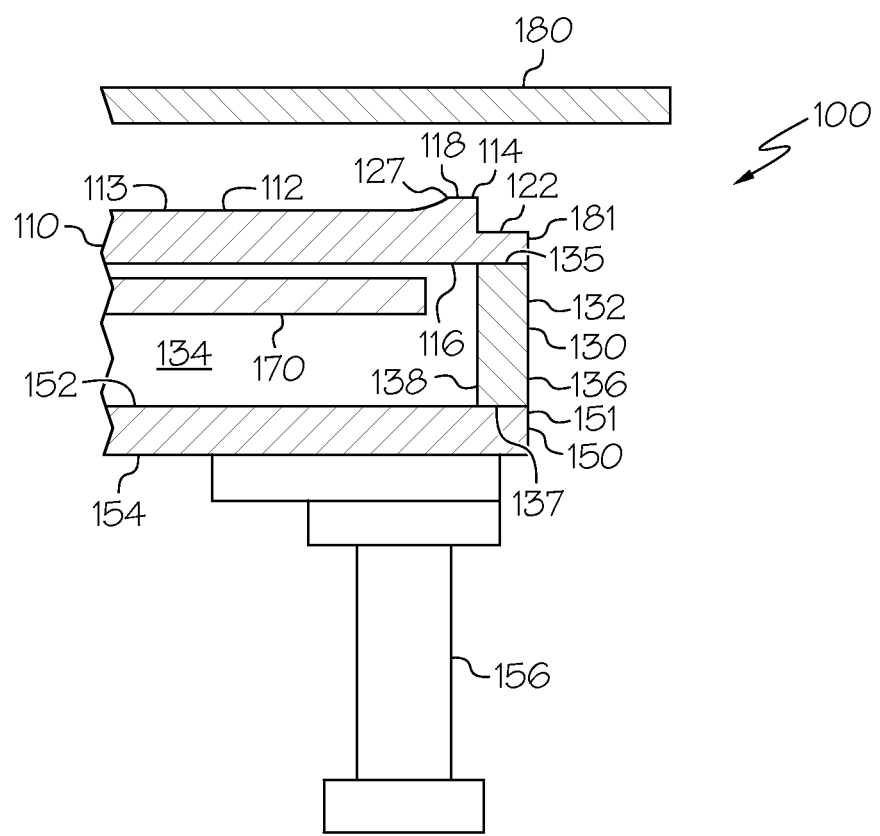
FIG. 1C schematically depicts a 2D cross-sectional side view of a mold assembly, according to one or more embodiments shown and described herein; Note on fig's 1A-1C: The base mold design is depicted as having a step inward around the upper surface of the mold, so that edge 114 is closer to the mold cavity edge 127 than edge 110. I believe the true base configuration does not have the step included, such that edge 114 is coincident with edge 110 at the same location as the outer plenum wall 130. As such, the mold would not have the "top hat" appearance as depicted, but rather have a uniform horizontal surface 118 outside the mold cavity.

Line 802 represents the base case mold, shown in FIGS. 1A, 1B, and 1C. The base case mold had a temperature difference of about 9° C., as depicted by line 802. The other samples represent the mold assembly features. Specifically, line 804 represents a mold assembly with a high emissivity thermal coating 190 on the topside and sides of the mold body having an emissivity of 0.97 at about 700° C. as depicted in FIG. 2B. The temperature difference caused by the high emissivity thermal coating 190 on the topside and sides of the mold body having an emissivity of 0.97 at about 700° C. was about 9° C., shown as the difference between lines 802 and 804. Line 806 represents a mold assembly having a high emissivity thermal coating 192 on the underside of the mold body having an emissivity of 0.97 at about 700° C. as depicted in FIG. 2B as well as the high emissivity thermal coating 190 on the topside and sides of the mold body having an emissivity of 0.97 at about 700° C. The temperature difference caused by the high emissivity thermal coating 192 on the underside of the mold body having an emissivity of 0.97 at about 700° C. was about 3° C., shown as the difference between lines 806 and 804. Line 808 represents the plenum wall channel depicted in FIGS. 6A and 6B as well as the high emissivity thermal coating 190 on the topside and sides of the mold body having an emissivity of 0.97 at about 700° C. The temperature difference caused by the plenum wall channel was about 8° C., shown as the difference between lines 808 and 804. Line 810 represents the annular channel in the mold body as depicted in FIGS. 5A and 5B, as well as the high emissivity thermal coating 190 on the topside and sides of the mold body having an emissivity of 0.97 at about 700° C. The temperature difference caused by the annular channel in the mold body was about 15° C., shown as the difference between lines 810 and 804.

Line 812 represents a combination of mold features (the high emissivity thermal coating 190 on the topside and sides of the mold body having an emissivity of 0.97 at about 700° C., the high emissivity thermal coating 192 on the underside of the mold body having an emissivity of 0.97 at about 700° C., the plenum wall channel, and the annular channel in the mold body). The temperature difference caused by the above listed combination of features was about 35° C., shown as the difference between lines 810 and 802. This was equal to the temperature differences caused by the features independently (i.e., 3° C. +9° C. +8° C. +15° C. =35° C.). Thus, each feature independently enhances the temperature difference of the mold assembly.

Example 2

Figure 8:
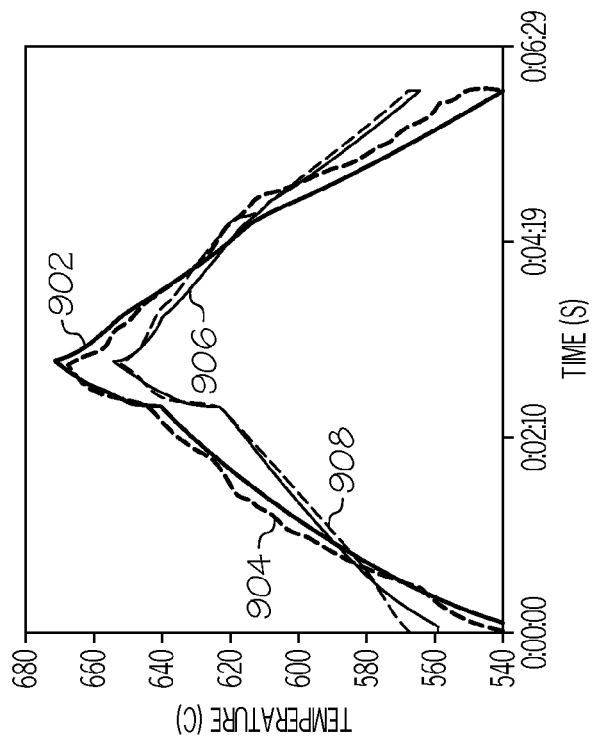
FIG. 8 graphically depicts modeled and experimental results for temperatures at the center of the mold cavity and at the perimeter of the mold cavity, according to one or more embodiments shown and described herein.

The computer modeling of Example 1 was compared with experimental data. FIG. 8 shows a comparison of the mold assembly temperature at the perimeter of the mold cavity and at the center of the mold cavity for modeled data and experimental data. Line 902 represents the modeled temperature at the perimeter of the mold cavity, line 904 represents the experimental temperature at the perimeter of the mold cavity, line 906 represents the modeled temperature at the center of the mold cavity, and line 908 represents the experimental temperature at the center of the mold cavity. As shown by FIG. 8, the computer model is a good predictor of experimentally tested temperatures.

Figure 9:
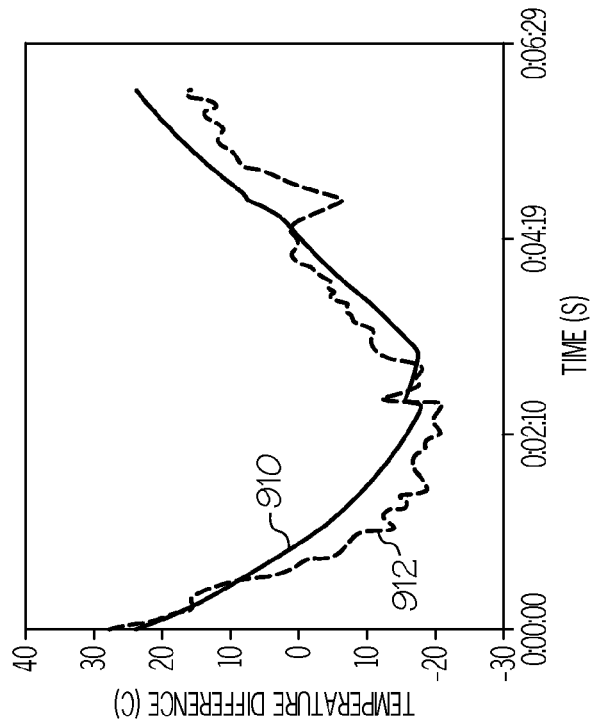
FIG. 9 graphically depicts modeled and experimental results for temperature differences between the center of the mold cavity and at the perimeter of the mold cavity, according to one or more embodiments shown and described herein.

FIG. 9 shows a comparison of the temperature difference between the center of the mold cavity and perimeter of the mold cavity for modeled and experimental data. Line 910 represents modeled data for the temperature difference and line 212 shows experimental data for the temperature difference. Again, the computer model is a good predictor of experimentally tested temperatures.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A mold assembly for forming a shaped glass article, the mold assembly comprising:
a mold body comprising a base portion defining an underside of the mold body and a forming portion protruding from a top of the base portion, wherein the forming portion comprises a mold cavity having a three-dimensional profile corresponding to a shape of the shaped glass article;
a support base positioned below the mold body;
a plenum body extending between the mold body and the support base, the plenum body comprising a plenum wall encircling a plenum space bounded by the plenum body, the mold body, and the support base, wherein:
the underside of the mold body comprises an annular channel adjacent to a projected perimeter of the mold cavity, the annular channel restricting thermal conduction from the mold body adjacent to an edge of the mold cavity to a central region of the mold cavity; and
when the mold assembly is heated to an average temperature of greater than or equal to about 650° C., a temperature at a center of the mold cavity is less than at a perimeter of the mold cavity, and a difference between the temperature at the center of the mold cavity and the temperature at the perimeter of the mold cavity is at least about 12° C.

2. The mold assembly of claim 1, wherein an outer perimeter of the plenum wall comprises a channel wherein a thickness of the plenum wall in the channel is less than a thickness of the plenum wall outside the channel such that the channel restricts thermal conduction from the edge of the mold cavity, through the plenum body, to the support base.

3. The mold assembly of claim 1, wherein a depth of the annular channel is greater near a projected center of the mold cavity than near sides of the forming portion of the mold body.

4. The mold assembly of claim 1, wherein at least a portion of the mold body comprises a thermal coating having an emissivity of at least about 0.9 at about 700° C.

5. The mold assembly of claim 4, wherein at least a portion of the mold body adjacent to the perimeter of the mold cavity comprises the thermal coating having an emissivity of at least about 0.9 at about 700° C.

6. The mold assembly of claim 4, wherein at least a portion of the underside of the mold body beneath the mold cavity comprises the thermal coating having an emissivity of at least about 0.9 at about 700° C.

7. The mold assembly of claim 1, wherein the mold assembly further comprises a cooling apparatus positioned in the plenum space adjacent to the underside of the mold body proximate a central portion of the mold cavity.

8. The mold assembly of claim 7, wherein the cooling apparatus is a heat exchanger.

9. The mold assembly of claim 1, wherein the plenum body is in direct contact with the base portion of the mold body at the perimeter of the base portion of the mold body and the plenum space is below the mold cavity.

10. A mold assembly for forming a shaped glass article, the mold assembly comprising:
a mold body comprising a base portion defining an underside of the mold body and a forming portion protruding from a top of the base portion, wherein the forming portion comprises a mold cavity having a three-dimensional profile corresponding to a shape of the shaped glass article;
a support base positioned below the mold body;
a plenum body extending between the mold body and the support base, the plenum body comprising a plenum wall encircling a plenum space bounded by the plenum body, the mold body, and the support base, wherein:
the forming portion of the mold body comprises notches or diagonal facets adjacent to corners of the mold cavity, wherein the notches or diagonal facets promote increased temperature in the corners of the mold cavity; and
when the mold assembly is heated to an average temperature of greater than or equal to about 650° C., a temperature at a center of the mold cavity is less than at a perimeter of the mold cavity, and a difference between the temperature at the center of the mold cavity and the temperature at the perimeter of the mold cavity is at least about 12° C.

11. The mold assembly of claim 10, wherein an outer perimeter of the plenum wall comprises a channel wherein a thickness of the plenum wall in the channel is less than a thickness of the plenum wall outside the channel such that the channel restricts thermal conduction from an edge of the mold cavity, through the plenum body, to the support base.

12. The mold assembly of claim 10, wherein at least a portion of the mold body comprises a thermal coating having an emissivity of at least about 0.9 at about 700° C.

13. The mold assembly of claim 12, wherein at least a portion of the mold body adjacent to the perimeter of the mold cavity comprises the thermal coating having an emissivity of at least about 0.9 at about 700° C.

14. The mold assembly of claim 12, wherein at least a portion of the underside of the mold body beneath the mold cavity comprises the thermal coating having an emissivity of at least about 0.9 at about 700° C.

15. The mold assembly of claim 10, wherein the mold assembly further comprises a cooling apparatus positioned in the plenum space adjacent to the underside of the mold body proximate a central portion of the mold cavity.

16. The mold assembly of claim 15, wherein the cooling apparatus is a heat exchanger.

17. The mold assembly of claim 10, wherein the plenum body is in direct contact with the base portion of the mold body at the perimeter of the base portion of the mold body and the plenum space is below the mold cavity.

18. A mold assembly for forming a shaped glass article, the mold assembly comprising:
a mold body comprising a base portion defining an underside of the mold body and a forming portion protruding from a top of the base portion, wherein the forming portion comprises a mold cavity having a three-dimensional profile corresponding to a shape of the shaped glass article;
a support base positioned below the mold body;
a plenum body extending between the mold body and the support base, the plenum body comprising a plenum wall encircling a plenum space bounded by the plenum body, the mold body, and the support base, wherein:
an outer perimeter of the plenum wall comprises a channel wherein a thickness of the plenum wall in the channel is less than a thickness of the plenum wall outside the channel such that the channel restricts thermal conduction from the edge of the mold cavity, through the plenum body, to the support base;

the underside of the mold body comprises an annular channel adjacent to a projected perimeter of the mold cavity, the annular channel restricting thermal conduction from the mold body adjacent to an edge of the mold cavity to a central region of the mold cavity;

the forming portion of the mold body comprises notches adjacent to corners of the mold cavity, the notches promoting increased temperature in the corners of the mold cavity; and the forming portion of the mold body comprises diagonal facets adjacent to the corners of the mold cavity, the diagonal facets promoting increased temperature in the corners of the mold cavity.

* * * * *